US012668121B2

(12) United States Patent
Huang

(10) Patent No.: US 12,668,121 B2
(45) Date of Patent: Jun. 30, 2026

(54) STRUCTURE FOR MULTI-DIRECTIONAL DRIVING AND STEERING OF FOUR-WHEELED VEHICLE

(71) Applicant: Yifeng Huang, Puer (CN)

(72) Inventor: Yifeng Huang, Puer (CN)

(73) Assignee: Yifeng Huang, Puer (CN)

( * ) Notice: Subject to any disclaimer, the term of this patent is extended or adjusted under 35 U.S.C. 154(b) by 358 days.

(21) Appl. No.: 18/685,433

(22) PCT Filed: Nov. 24, 2023

(86) PCT No.: PCT/CN2023/133819
§ 371 (c)(1),
(2) Date: Feb. 21, 2024

(87) PCT Pub. No.: WO2024/164634
PCT Pub. Date: Aug. 15, 2024

(65) Prior Publication Data
US 2025/0121681 A1 Apr. 17, 2025

(30) Foreign Application Priority Data
Feb. 10, 2023 (CN) .......................... 202310098128.5

(51) Int. Cl.
B60K 17/34 (2006.01)
B60K 17/06 (2006.01)
(Continued)

(52) U.S. Cl.
CPC .............. B60K 17/34 (2013.01); B60K 17/06 (2013.01); B62D 7/06 (2013.01); B62D 7/1518 (2013.01)

(58) Field of Classification Search
CPC ........ B60K 17/34; B60K 17/22; B60K 17/24; B60K 17/30; B60K 17/303; B60K 17/358;
(Continued)

(56) References Cited

U.S. PATENT DOCUMENTS 7,458,431 B2 * 12/2008 Irikura ................. B62D 7/1509
180/6.26
7,493,975 B2 * 2/2009 Irikura ................. B62D 11/183
180/6.32
(Continued)

FOREIGN PATENT DOCUMENTS

CN 203094172 U * 7/2013 ........... B62D 5/0418
CN 204726507 U * 10/2015
(Continued)

*Primary Examiner* — Bobby Rushing, Jr.
(74) *Attorney, Agent, or Firm* — OPENPTO US LLC; Yuhao Liang

(57) ABSTRACT

A structure for multi-directional driving and steering of a four-wheeled vehicle is provided. The structure includes a frame; a mounting frame fixedly arranged on the frame; a first transmission portion rotatably arranged on the mounting frame; and a second transmission portion rotatably arranged on the mounting frame. The structure also includes a third transmission portion rotatably arranged on the first transmission portion and the second transmission portion; and a fourth transmission portion rotatably arranged below the third transmission portion. The structure further includes a mounting seat connected to the mounting frame through a shock absorber; a driving power input rotation shaft arranged on the mounting frame and connected to the first transmission portion; a steering power input rotation shaft arranged on the mounting frame and connected to the second transmission portion; and a driving power output shaft arranged on the fourth transmission portion.

13 Claims, 6 Drawing Sheets

(51) Int. Cl.
　　*B62D 7/06*　　　　(2006.01)
　　*B62D 7/15*　　　　(2006.01)
(58) Field of Classification Search
　　CPC .......... B62D 7/06; B62D 7/14; B62D 7/1509;
　　　　　　　　　　B62D 7/1518; B62D 7/1527
　　See application file for complete search history.

(56)　　　　　　　References Cited

U.S. PATENT DOCUMENTS

|  |  |  |  |  |
|---|---|---|---|---|
| 7,857,079 | B2 * | 12/2010 | Irikura ................... | B62D 7/142 |
|  |  |  |  | 180/6.32 |
| 11,046,176 | B2 * | 6/2021 | Danielson .............. | B60K 17/22 |
| 2020/0070878 | A1 * | 3/2020 | Du .......................... | B62D 7/18 |

FOREIGN PATENT DOCUMENTS

|  |  |  |  |  |  |
|---|---|---|---|---|---|
| CN | 105270169 | A | * | 1/2016 |  |
| CN | 107651001 | A | * | 2/2018 | ........... B62D 5/0418 |
| CN | 105857387 | B | * | 1/2019 | .............. B62D 7/04 |
| CZ | 306763 | B6 | * | 6/2017 |  |
| DE | 602004009141 | T2 | * | 7/2008 | ............. A01D 34/66 |
| JP | S6025858 | A | * | 2/1985 |  |
| JP | H0526743 | U | * | 4/1993 |  |

* cited by examiner

STRUCTURE FOR MULTI-DIRECTIONAL DRIVING AND STEERING OF FOUR-WHEELED VEHICLE

CROSS-REFERENCE TO RELATED APPLICATIONS

This patent application is a national stage application of International Patent Application No. PCT/CN2023/133819, filed on Nov. 24, 2023, which claims priority of Chinese Patent Application No. 202310098128.5, filed on Feb. 10, 2023, both of which are incorporated by reference in their entities.

TECHNICAL FIELD

The present disclosure relates to the technical field of automotive equipment, in particular to a structure for multi-directional driving and steering of a four-wheeled vehicle.

BACKGROUND

In a power system of an automobile, a driving power system and a steering power system are two critical systems. In the driving power system, power is output by an engine, and the power is transmitted to a hub through a variable speed transmission mechanism to drive wheels to rotate, thus driving the automobile body to move forward. In the steering power system, rotation of a steering wheel is manually controlled, and the power is transmitted to the steering tie rod by a transmission mechanism to pull the wheels to steer. The driving power system of an automobile is divided into front-wheel drive, rear-wheel drive and four-wheel drive, according to the driving mode. Regardless of type of the driving mode, when the driving power system is used in cooperation with the steering power system, requirement that the two systems do not affect each other should be met. In the prior art, technology of cooperative use of the driving power system and the steering power system has been very mature. However, the existing driving power system and steering power system have dead spots during use, so it is impossible to achieve large-angle steering during driving, which is caused by structural characteristics of a driving structure and a steering structure. In some special requirements and workplaces, lateral movement, steering, and turning around, or even turning around in place within a small range are required, which cannot be achieved by the existing driving and steering structures of the automobile.

SUMMARY

Thus, it would be desirable to overcome the disadvantage in the prior art that large-angle steering cannot be achieved by cooperation of a driving system and a steering system of an automobile. A structure for multi-directional driving and steering of a four-wheeled vehicle is provided for overcoming this issue.

In accordance with embodiments of the invention, a structure for multi-directional driving and steering of a four-wheeled vehicle includes a frame. The structure further includes a mounting frame fixedly arranged on the frame and configured for mounting a first transmission portion and a second transmission portion for transmission; the first transmission portion rotatably arranged on the mounting frame and configured for transmitting driving power; the second transmission portion rotatably arranged on the mounting frame and configured for transmitting steering power; a third transmission portion rotatably arranged on the first transmission portion and the second transmission portion and configured for transmitting both the driving power and the steering power; a fourth transmission portion rotatably arranged below the third transmission portion and configured for transmitting the driving power; a mounting seat connected to the mounting frame through a shock absorber and configured for mounting the fourth transmission portion; a driving power input rotation shaft arranged on the mounting frame and connected to the first transmission portion; a steering power input rotation shaft arranged on the mounting frame and connected to the second transmission portion; and a driving power output shaft arranged on the fourth transmission portion.

In one embodiment, the mounting frame is configured with an inverted U-shaped frame body, and a shock absorber mounting portion configured for mounting the shock absorber is arranged on a top of the mounting frame. The first transmission portion is rotatably arranged in a U-shaped interior of the mounting frame through a first transmission shaft. The second transmission portion is rotatably arranged in the U-shaped interior of the mounting frame through a second transmission shaft. The first transmission shaft is arranged parallel to the second transmission shaft.

In one embodiment, a gearbox is provided as the first transmission portion, a third transmission shaft is rotatably arranged in the gearbox, the third transmission shaft is connected to the first transmission shaft through a helical gear, and the first transmission shaft is connected to the driving power input rotation shaft. A gearbox is provided as the second transmission portion, a fifth transmission shaft is rotatably arranged in the gearbox, the fifth transmission shaft is connected to the second transmission shaft through a helical gear, and the second transmission shaft is connected to the steering power input rotation shaft.

In one embodiment, a gearbox is provided as the third transmission portion, and an interior of the third transmission portion is divided into an upper portion and a lower portion. The upper portion of the third transmission portion is rotatably connected to the first transmission portion through a fourth transmission shaft, and the lower portion of the third transmission portion is rotatably connected to the second transmission portion through a sixth transmission shaft. The fourth transmission shaft is connected to the third transmission shaft through a helical gear, and the sixth transmission shaft is connected to the fifth transmission shaft through a helical gear.

In some embodiments, an eighth transmission shaft is rotatably arranged in the third transmission portion. An upper portion of the eighth transmission shaft is rotatably connected to the fourth transmission shaft through a helical gear. A bottom of the eighth transmission shaft is extended out of the third transmission portion and is rotatably connected to a gearbox seat. A rotatable sleeve is rotatably arranged at a lower portion of the eighth transmission shaft. A helical gear is arranged on the rotatable sleeve, and the rotatable sleeve is connected to the sixth transmission shaft through the helical gear. A bottom of the rotatable sleeve is extended out of the third transmission portion and the gearbox seat and is connected to a connecting flange. The connecting flange is fixedly connected to the fourth transmission portion.

In one embodiment, a gearbox is provided as the fourth transmission portion, and the eighth transmission shaft is rotatably arranged in the fourth transmission portion and is connected to the driving power output shaft through a helical gear.

In one embodiment, a U-shaped seat is provided as the mounting seat, the fourth transmission portion is rotatably arranged in the mounting seat through the eighth transmission shaft, and a shock absorber mounting seat configured for mounting the shock absorber is arranged at an outer side of the mounting seat.

In one embodiment, a ninth transmission shaft is rotatably arranged at an upper portion of an interior of the third transmission portion, and the ninth transmission shaft is connected to the fourth transmission shaft and the eighth transmission shaft through helical gears. A tenth transmission shaft is rotatably arranged at a lower portion of the interior of the third transmission portion, and the tenth transmission shaft is connected to the rotatable sleeve and the sixth transmission shaft through helical gears.

In some embodiments, a connecting frame is rotatably arranged at a side of the mounting frame, the connecting frame is rotatably connected to a side of the third transmission portion through the fourth transmission shaft and the sixth transmission shaft, respectively.

In one embodiment, a fifth gearbox is arranged in the mounting frame, and a fourth gearbox is arranged at a lower portion of the mounting frame. The first transmission shaft is rotatably arranged in the fourth gearbox, and the second transmission shaft is rotatably arranged in the fifth gearbox. The driving power input rotation shaft is rotatably arranged in the fifth gearbox, and the steering power input rotation shaft is rotatably arranged in the fourth gearbox.

The present disclosure has the following advantages: brand-new driving power transmission and steering power transmission are provided, and the combined use of the driving power transmission and the steering power transmission also provides a brand-new connecting structure, through which the dead spots in steering during the driving process of existing vehicles can be eliminated, and the steering of at least 180 degrees can be achieved without affecting the output of the driving power. Therefore, the disadvantage in the prior art that the large-angle steering cannot be achieved by the cooperation of the driving system and the steering system of the automobile is overcome. The structure can achieve the functions of lateral movement, steering, turning around and even in-place turning around of vehicles within a small range, and can adapt to various complicated environment and road conditions.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
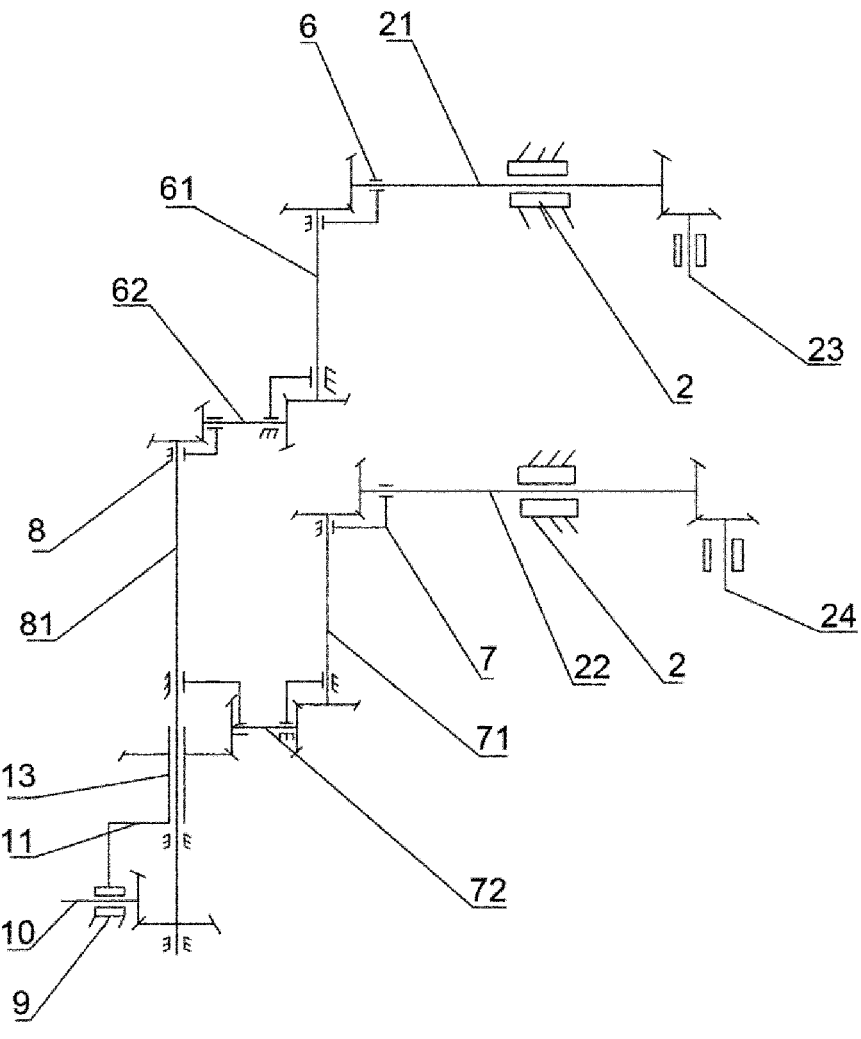
FIG. 1 is a schematic diagram of a transmission mechanism according to an embodiment of the present disclosure.

To make the purpose, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. The components of the embodiments of the present disclosure generally described and illustrated in the accompanying drawings here can be arranged and designed in a variety of different configuration.

Therefore, the following detailed description of the embodiments of the present disclosure provided in the accompanying drawings is not intended to limit the claimed scope of the present disclosure, but merely represents selected embodiments of the present disclosure. All other embodiments obtained by those of ordinary skill in the art based on the embodiments of the present disclosure without creative efforts shall fall within the scope of protection of the present disclosure.

It should be noted that, without conflict, the embodiments in the present disclosure and the features in the embodiments can be combined with each other.

It should be noted that similar symbols and letters indicate similar items in the following accompanying drawings. Therefore, once an item is defined in one drawing, it does not need to be defined and explained preferentially in subsequent drawings.

In the description of the present disclosure, it needs to be understood that the orientation or positional relationship indicated by terms "center", "top", "bottom", "left", "right", "vertical", "horizontal", "inside" and "outside" is based on the orientation or positional relationship shown in the drawings, or the orientation or positional relationship that the product provided by the present disclosure is usually placed when used, or the orientation or positional relationship that is commonly understood by those skilled in the art, which is only for convenience of description of the present disclosure and simplification of description rather than indicating or implying that the device or element referred to must have a particular orientation, be constructed and operate in a particular orientation, and thus cannot to be construed as limiting the present disclosure. Furthermore, the terms "first" and "second" are used for descriptive purposes only and are not to be construed as indicating or implying relative importance.

In the present disclosure, unless expressly specified and limited otherwise, the terms "arrange", "mount", "connect", "couple" and the like should be understood broadly, e.g., may be either a fixed connection or a detachable connection, or integrated connection; may be a mechanical connection or an electrical connection; may be a direct connection or an indirect connection through an intermediate medium, may be an internal communication between the two elements or interactions between the two elements. For those of ordinary skill in the art, the specific meanings of the above terms in the present disclosure can be understood in specific situations.

Figure 2:
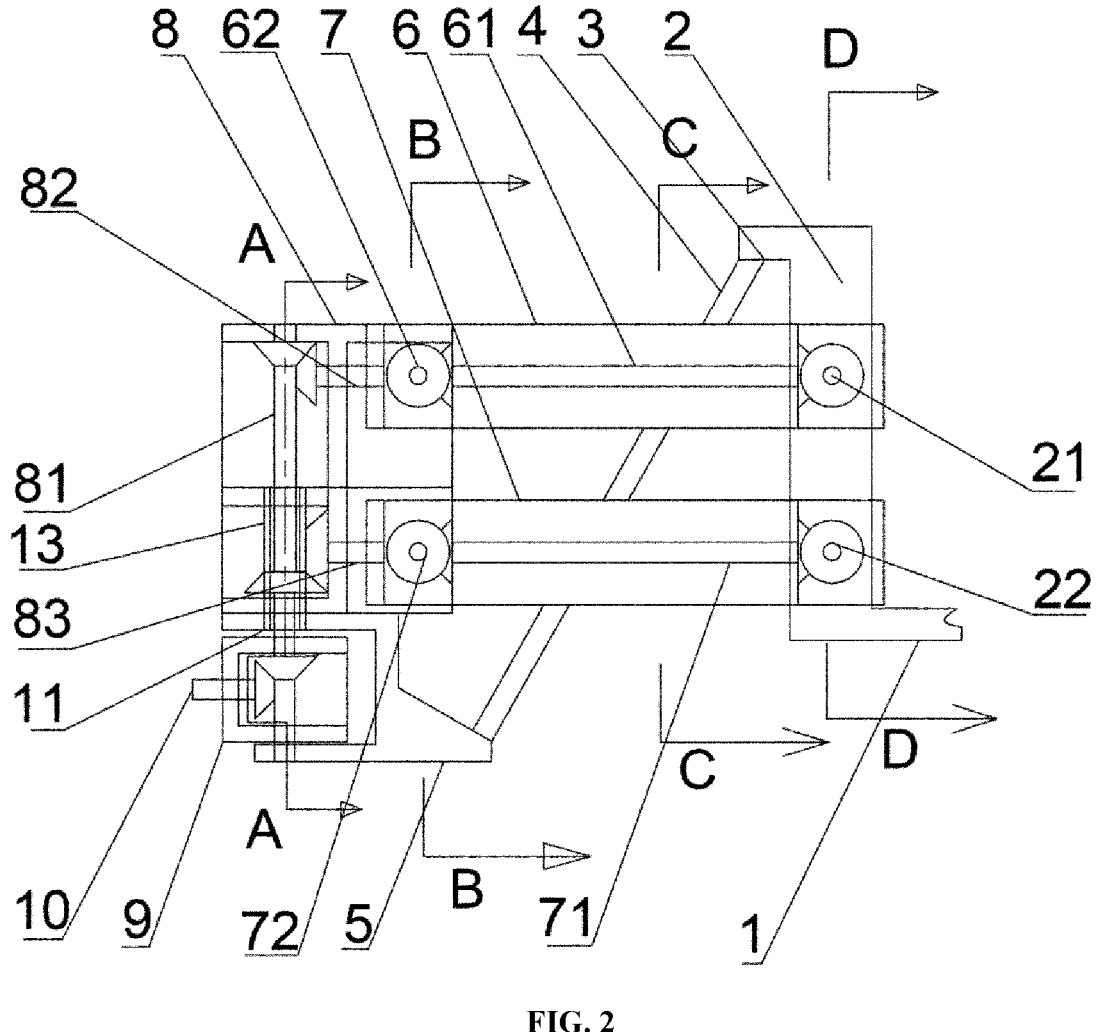
FIG. 2 is a schematic diagram of a structure according to an embodiment of the present disclosure.
Figure 3:
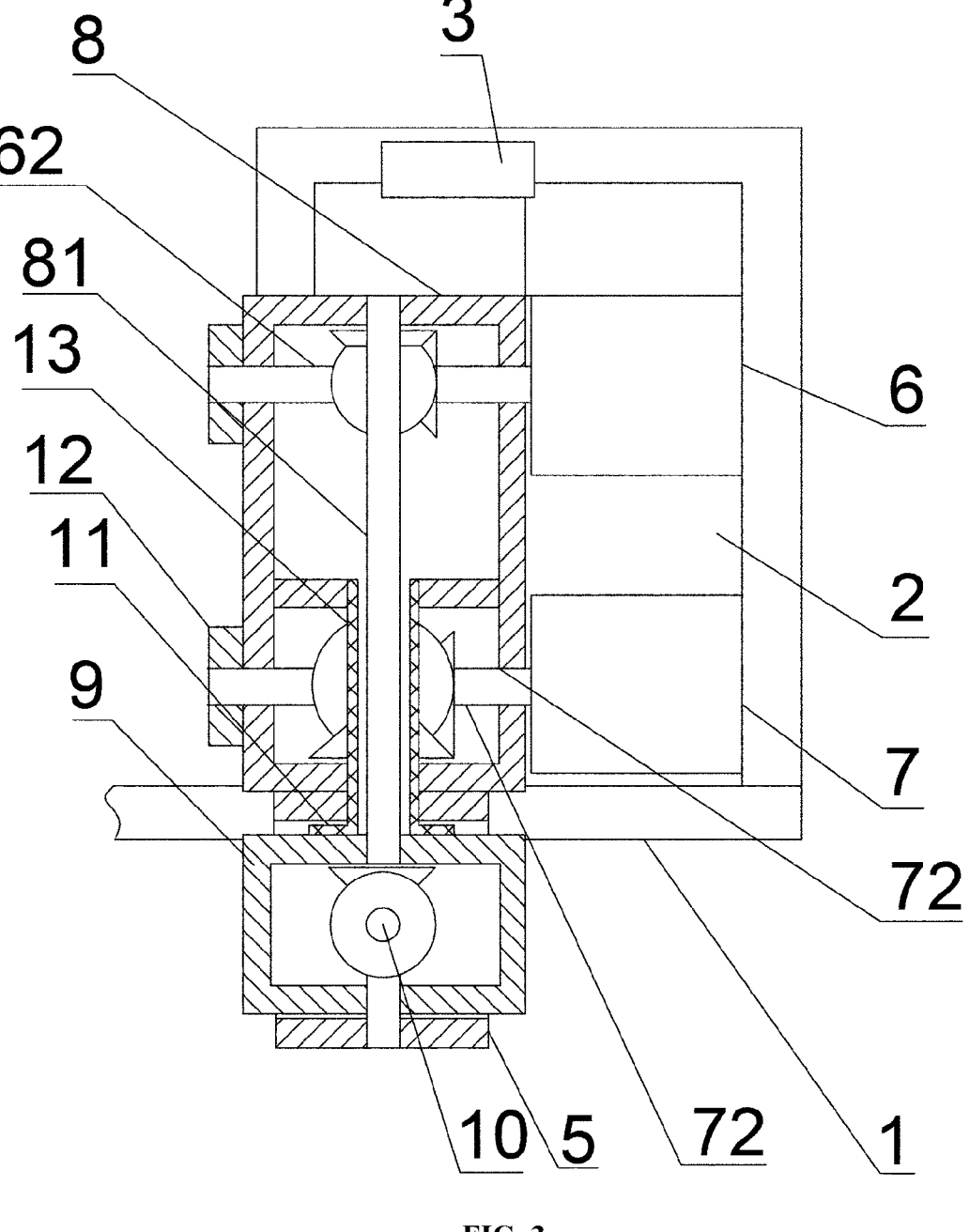
FIG. 3 is a stepped sectional diagram of the structure of FIG. 2 taken along an A-A direction.
Figure 4:
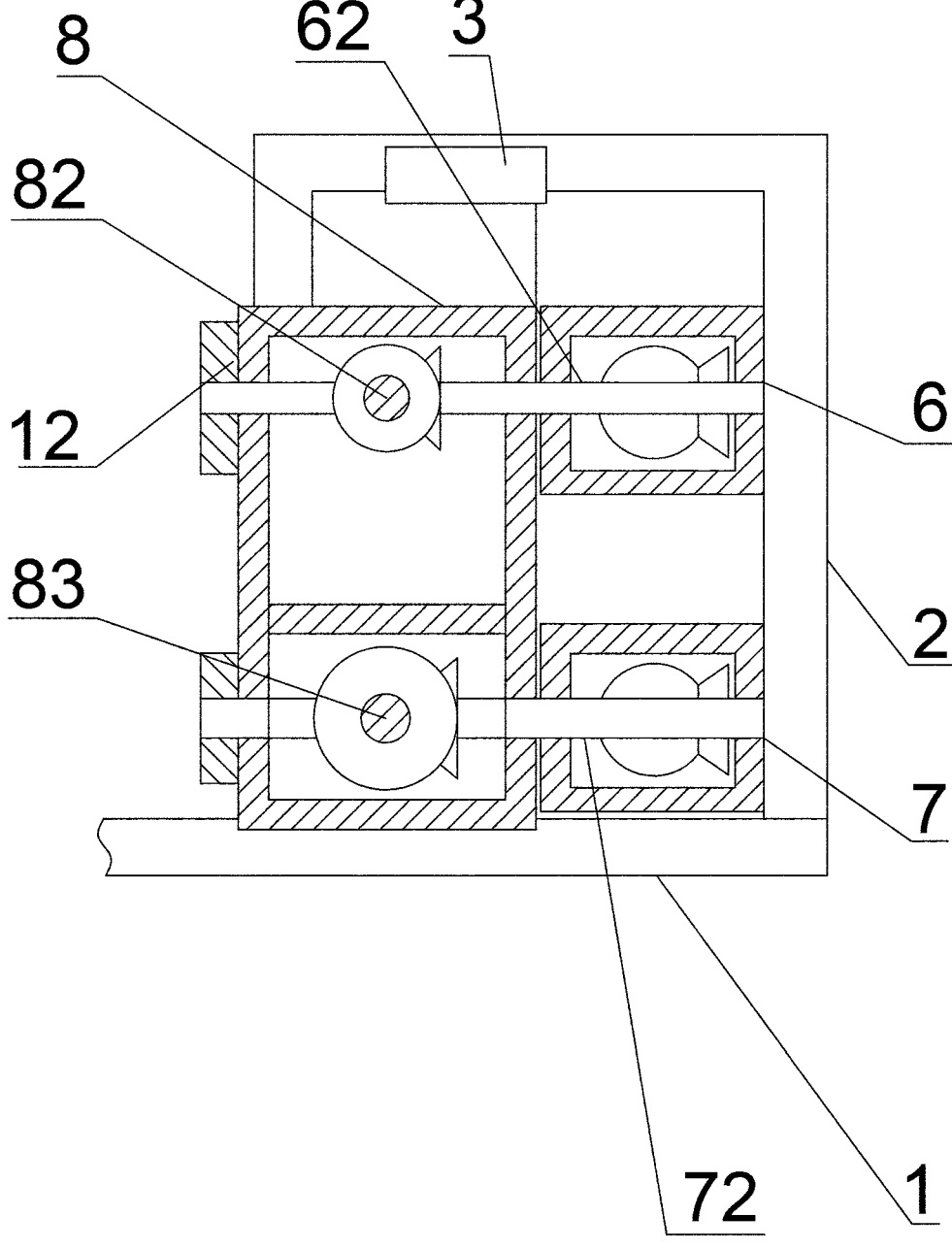
FIG. 4 is a sectional diagram of the structure of FIG. 2 taken along a B-B direction.
Figure 5:
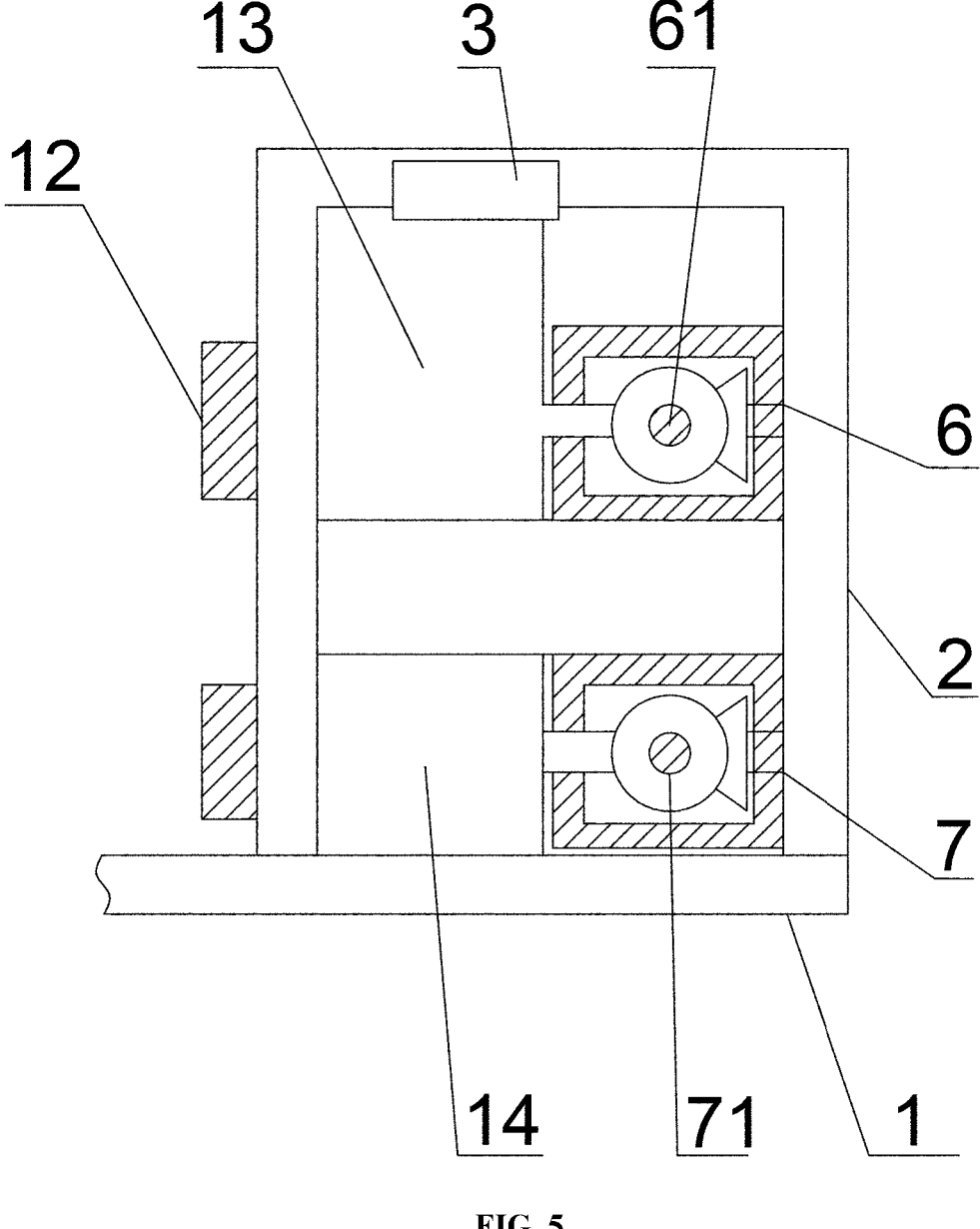
FIG. 5 is a sectional diagram of the structure of FIG. 2 taken along a C-C direction.
Figure 6:
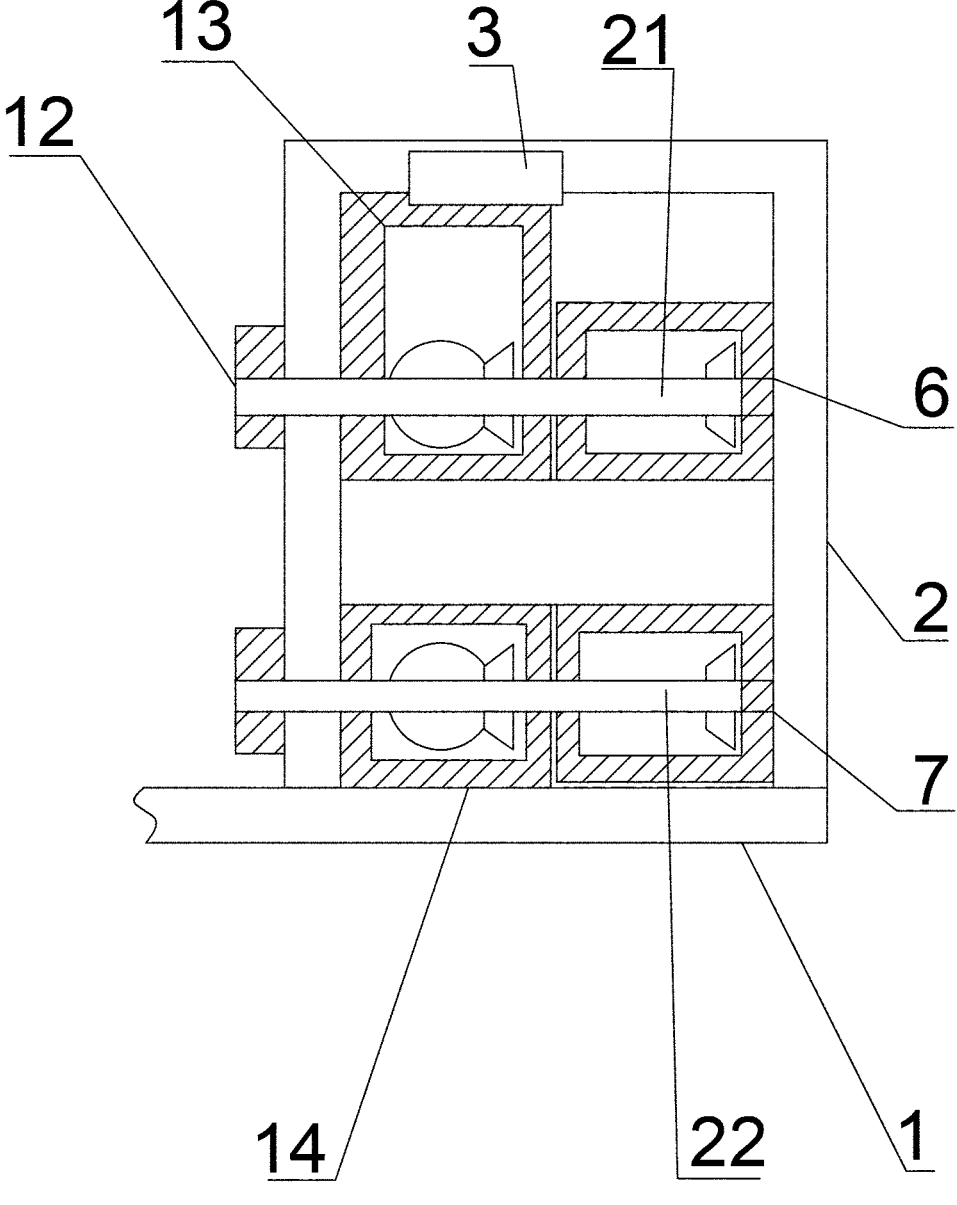
FIG. 6 is a sectional diagram of the structure of FIG. 2 taken along a D-D direction.

As shown in FIG. 1 to FIG. 6, a structure for multi-directional driving and steering of a four-wheeled vehicle includes an original frame 1. Certainly, the frame can also be redesigned. The specific improvement of the device is to provide a brand-new linkage mechanism for driving transmission and steering transmission of a four-wheeled vehicle, so as to achieve the functions of turning around in place, oblique driving and lateral movement of the vehicle. Throughout the present disclosure, the entire technical solution is designed by a mechanical structure, so as to ensure the reliability of technology in use to the maximum extent. Certainly, other auxiliary power systems can also be used in the technical solution. This structure is not only limited to the application of a mechanical transmission structure, but can also be applied to other power-assisted driving and steering transmissions. In particular, this structure further includes other transmission components, which are as follows: a mounting frame 2 fixedly arranged on the frame 1 and configured for mounting a first transmission portion 6 and a second transmission portion 7 for transmission, the mounting frame 2 is fixed on the frame 1 by welding, or fixedly connected to the frame 1 by a detachable bolt structure, depending on the actual vehicle model and vehicle driving requirements; the first transmission portion 6 rotatably arranged on the mounting frame 2 and configured for transmitting driving power, the function of the first transmission portion 6 is to transmit power output from an engine; the second transmission portion 7 rotatably arranged on the mounting frame 2 and configured for transmitting steering power, the function of the second transmission portion 7 is to transmit power for turning a steering wheel, in the accompanying drawings of this embodiment, only the basic steering transmission is shown, for more convenient and easier control, the structure provided in the present disclosure may also be used in conjunction with the existing auxiliary steering power, specifically, an output end of the existing auxiliary steering power is connected to a steering power output rotation shaft of the second transmission portion 7 through a gear; a third transmission portion 8 configured for transmitting both the driving power and the steering power, the structure provided in the present disclosure focuses on the third transmission portion 8, and above all, the third transmission portion 8 transmits both the driving power and the steering power, so that the output of the steering power does not affect the output of the driving power during the transmission of the driving power of the vehicle, particularly, a steering direction in the present disclosure is at least from 90 degrees to 180 degrees, which cannot be achieved by the existing steering structure, the dead spots of the existing mechanism can be eliminated through the structure provided in the present disclosure, so as to achieve free driving transmission and steering transmission, in particular, the third transmission portion 8 is rotatably arranged on both the first transmission portion 6 and the second transmission portion 7; A fourth transmission portion 9 rotatably arranged below the third transmission portion 8 and configured for transmitting the driving power, the fourth transmission portion 9 is actually located at the end of the power transmission; a driving power output shaft 10 arranged on the fourth transmission portion 9, and wheels are mounted on the driving power output shaft 10 to change the driving power into driving; a mounting seat 5 connected to the mounting frame 2 through a shock absorber 4 and configured for mounting the fourth transmission portion 9. In the entire structure, the functions of support and shock absorption should also be considered, and the shock absorber 4 is also configured for supporting and shock-absorbing in this structure. Certainly, the mounting seat 5 is also configured for mounting other components, such as a brake system. Certainly, these systems should also be redesigned. In the present disclosure, it is not claimed that a driving power input rotation shaft 23 arranged on the mounting frame 2 is connected to the first transmission portion 6 for power input, and a steering power input rotation shaft 24 arranged on the mounting frame 2 is connected to the second transmission portion 7 for power input. In this structure, power is input on the mounting frame 2, the power is provided by the engine. After speed adjustment through other power transmission structures and corresponding gearboxes, the power is input through connection with a corresponding input rotation shaft.

In another embodiment, at least one specific structure of the mounting frame 2 is provided in the present disclosure. One structure is to provide the mounting frame 2 with an inverted U-shaped frame body, and the mounting frame 2 is mounted on the frame 1 with an opening thereof facing downwards, a shock absorber mounting portion 3 configured for mounting the shock absorber 4 is arranged on a top of the mounting frame 2. The first transmission portion 6 is rotatably arranged in a U-shaped interior of the mounting frame 2 through a first transmission shaft 21. The second transmission portion 7 is rotatably arranged in the U-shaped interior of the mounting frame 2 through a second transmission shaft 22. The first transmission shaft 21 is arranged parallel to the second transmission shaft 22 in a vertical direction. As such, the first transmission portion 6 and the second transmission portion 7 can rotate to a certain extent in the mounting frame 2 through the rotation shafts. Another structure is to use grooves, and the first transmission shaft 21 and the second transmission shaft 22 are rotatably arranged in the grooves through rotation shafts, such that rear parts of the first transmission shaft 21 and the second transmission shaft 22 can be protected better. Certainly, other mounting frames 2 can also be used, as long as they are have such a structure that the first transmission shaft 21 and the second transmission shaft 22 are rotatably arranged therein through rotation shafts.

In another embodiment, the structure includes at least one first transmission portion 6 and second transmission portion 7. In this embodiment, a gearbox is provided as the first transmission portion 6, the gearbox is arranged in a long cylindrical shape, a third transmission shaft 61 is rotatably arranged in the gearbox, and the third transmission shaft 61 is connected to the first transmission shaft 21 through a helical gear for power transmission. In this embodiment, one transmission mode is to connect the first transmission shaft 21 to the driving power input rotation shaft 23, and another transmission mode is to directly connect the first transmission shaft 21 as the driving power input rotation shaft to other power output shafts such as a gearbox. Similarly, as the first transmission shaft 21 is arranged parallel to the second transmission shaft 22 in a vertical direction, a gearbox is also provided as the second transmission portion 7, the gearbox is also arranged in a long cylindrical shape, a fifth transmission shaft 71 is rotatably arranged in the gearbox, and the fifth transmission shaft 71 is connected to the second transmission shaft 22 through a helical gear. Similarly, in this embodiment, a transmission mode is to connect the second transmission shaft 22 to the steering power input rotation shaft 24, and another transmission mode is to directly connect the second transmission shaft 22 as the steering power input rotation shaft to a steering wheel through other power transmission mechanisms. In this device, another structure of the first transmission portion 6 and the second transmission portion 7 is to arrange each of the first transmission portion 6 and the second transmission portion as a dumbbell-shaped box body, with gearboxes at both ends and a cylinder in the middle for connection and support, and thus materials are saved.

In another embodiment, a specific third transmission portion 8 is provided. A gearbox is provided as the third transmission portion 8, and an interior of the third transmission portion 8 is divided into an upper portion and a lower portion, which can be separated by a plate in the middle. The upper portion of the third transmission portion 8 is rotatably connected to the first transmission portion 6 through a fourth transmission shaft 62 for power transmission. The lower portion of the third transmission portion 8 is rotatably connected to the second transmission portion 7 through a sixth transmission shaft 72 for power transmission. The fourth transmission shaft 62 is connected to the third transmission shaft 61 through a helical gear, and the sixth transmission shaft 72 is connected to the fifth transmission shaft 71 through a helical gear. In this embodiment, as the first transmission portion 6 is arranged parallel to the second transmission portion 7 in a vertical direction, and the first transmission portion 6 and the second transmission portion 7 are rotatably arranged in the mounting frame 2, the connection between the third transmission portion 8 and each of the first transmission portion and the second transmission portion must be rotatable, thus forming a parallelogram, which can move in the vertical direction relative to each other to facilitate shock absorption and avoid the problem of jamming.

In another embodiment, an eighth transmission shaft 81 is rotatably arranged in the third transmission portion 8 for power transmission. An upper portion of the eighth transmission shaft 81 is rotatably connected to the fourth transmission shaft 62 through a helical gear for the driving power transmission. A bottom of the eighth transmission shaft 81 is extended out of the third transmission portion 8, and is rotatably connected to a gearbox seat 5, so as to provide another support for the entire third transmission portion 8. A rotatable sleeve 13 is rotatably arranged at a lower portion of the eighth transmission shaft 81. A helical gear is arranged is arranged on the rotatable sleeve 13, and the rotatable sleeve 13 is connected to the sixth transmission shaft 72 through the helical gear for the steering power transmission. A bottom of the rotatable sleeve 13 is extended out of the third transmission portion 8 and the gearbox seat 5 and is connected to a connecting flange 11. The connecting flange 11 is fixedly connected to the fourth transmission portion 9. As such, the third transmission portion 8 can provide both driving power output and steering power output. Finally, a gearbox is provided as the fourth transmission portion 9, the eighth transmission shaft 81 is rotatably arranged in the fourth transmission portion 9 and is connected to the driving power output shaft 10 through a helical gear.

In another embodiment, a mounting seat 5 is included. A U-shaped seat is provided as the mounting seat 5, the fourth transmission portion 9 is rotatably arranged in the mounting seat 5 through the eighth transmission shaft 81, and a shock absorber mounting seat configured for mounting the shock absorber 4 is arranged at an outer side of the mounting seat 5. Such a mounting seat at least can provide a 180-degree steering space for the fourth transmission portion 9. Another mounting seat 5 capable of providing a 360-degree steering space is arranged in an L shape, an end of the mounting seat 5 may be connected to the third transmission portion 8, and the space below the mounting seat 5 is left empty, such that the fourth transmission portion 9 can rotate at any angle below the mounting seat 5.

In another embodiment, in order to facilitate the adjustment and control of a rotating direction and also to disperse a supporting force, a ninth transmission shaft 82 is rotatably arranged at the upper portion of the interior of the third transmission portion 8, and the ninth transmission shaft 82 is connected to the fourth transmission shaft 62 and the eighth transmission shaft 81 through helical gears. A tenth transmission shaft 83 is rotatably arranged at the lower portion of the interior of the third transmission portion 8, and the tenth transmission shaft 83 is connected to the rotatable sleeve 13 and the sixth transmission shaft 72 through helical gears.

In another embodiment, in order to facilitate the symmetrical force distribution of the entire structure, a connecting frame 12 is rotatably arranged at a side of the mounting frame 2, and the connecting frame 12 is rotatably connected to a side of the third transmission portion 8 through the fourth transmission shaft 62 and the sixth transmission shaft 72, respectively.

In another embodiment, the structure provided in the present disclosure can be applied to a separate front-wheel drive or rear-wheel drive, as well as to four-wheel drive. When the structure is applied to the four-wheel drive, a structure that enables four wheels to be used for driving is that a fifth gearbox is arranged in the mounting frame 2, and a fourth gearbox 14 is arranged at a lower portion of the mounting frame 2. The first transmission shaft 21 is rotatably arranged in the fourth gearbox 14, and the second transmission shaft 22 is rotatably arranged in the fifth gearbox 15. The driving power input rotation shaft 23 is rotatably arranged in the fifth gearbox 15, and the steering power input rotation shaft 24 is rotatably arranged in the fourth gearbox 14. As such, the two power input shafts are redirected through the two gearboxes, and by arranging other variable direction gearboxes on the frame, front and rear structures are connected through transmission shafts, so that the four wheels are driven by one engine for driving and steering.

In the present disclosure, bearings are arranged at rotational positions of shaft connections, which are not shown in the accompanying drawings of the present disclosure. The use of bearings to assist rotation is well known in the art and will not be described in the present disclosure, but it cannot be understood that bearings are not used to assist rotation at the rotational positions in the present disclosure. Meanwhile, the gearbox in the present disclosure cannot be understood as a completely hollow gearbox as shown in the accompanying drawings, instead, all gearboxes arranged according to the characteristics of gear transmission should fall within the scope of protection of the gearbox in the present disclosure. For those of ordinary skill in the art, the specific meanings of the above terms in the present disclosure can be understood in specific situations.

In this device, a traditional direction control mechanism of the vehicle is used, steering mechanisms of front and rear axles of the vehicle are connected through a conventional shaft transmission mechanism in the middle, and the direction control mechanism includes two output shafts and one input shaft. The input shaft is connected to the steering wheel. The two output shafts are respectively connected to the steering mechanisms of the front and rear axles, i.e., the steering power input rotation shaft 24, and thus achieving the turning of front and rear wheels simultaneously. A direction control method of the device is that a direction control mechanism is provided with four gears positions, and the direction control mechanism can be arranged in the four gear positions through a shifting mechanism structure, such as a gear shifting structure of an automobile. A first gear position is used to control the two output shafts to operate in a same direction, two wheels on the front axle turn in a same direction, and two wheels on the rear axle turn in a same direction, but the turning direction of the two wheels on the front axle is opposite to that of the two wheels on the rear axle, so as to implement the functions of controlling the vehicle to move forward and backward, and turn around in-place normally. A second gear position can be used when road conditions are complicated, the two output shafts of the control box operates in opposite directions, and the four wheels on the front axle and the rear axle turn in a same direction, so as to implement the functions of oblique and lateral movement of the vehicle. In chariots or special vehicles, a third gear position and a fourth gear position can be provided, the third gear position is used to lock a rear-axle output shaft of a steering control box, and only the front-axle steering control (front direction control) operates. The fourth gear position is used to lock a front-axle output shaft of the steering control box, and only the rear-axle steering control (rear direction control) operates. Such functions make it easier for the vehicle to get out of trouble in complicated road conditions. In consideration of safety, the gear positions can only be shifted when the vehicle is at rest. Moreover, the functions of turning around in-place, oblique and lateral movement of the vehicle can only be effectively used at a low-speed gear position.

A suspension power transmission method of the structure provided in the present disclosure is to change the transmission function through three differentials. An output shaft at one end of a first differential is transmitted to an input end of a second differential for driving the two wheels on the front axle; and an output shaft at the other end of the first differential is transmitted to an input end of a third differential for driving the two wheels on the rear axle.

Although the present disclosure has been described in detail with reference to above embodiments, those skilled in the art still can modify the technical solutions recorded in the above embodiments, or replace some technical features by equivalents. Any modification, equivalent replacement, improvement, etc. made within the spirit and principle of the present disclosure should be included in the scope of protection of the present disclosure.

What is claimed is:

1. A structure for multi-directional driving and steering of a four-wheeled vehicle, comprising:

a frame, a mounting frame fixedly arranged on the frame and configured for mounting a first transmission portion and a second transmission portion for transmission;

the first transmission portion rotatably arranged on the mounting frame and configured for transmitting driving power;

the second transmission portion rotatably arranged on the mounting frame and configured for transmitting steering power;

a third transmission portion rotatably arranged on the first transmission portion and the second transmission portion and configured for transmitting both the driving power and the steering power;

a fourth transmission portion rotatably arranged below the third transmission portion and configured for transmitting the driving power;

a mounting seat connected to the mounting frame through a shock absorber and configured for mounting the fourth transmission portion;

a driving power input rotation shaft arranged on the mounting frame and connected to the first transmission portion;

a steering power input rotation shaft arranged on the mounting frame and connected to the second transmission portion; and a driving power output shaft arranged on the fourth transmission portion.

2. The structure for multi-directional driving and steering of a four-wheeled vehicle according to claim 1, wherein the mounting frame is configured with an inverted U-shaped frame body, a shock absorber mounting portion configured for mounting the shock absorber is arranged on a top of the mounting frame;

the first transmission portion is rotatably arranged in a U-shaped interior of the mounting frame through a first transmission shaft;

the second transmission portion is rotatably arranged in the U-shaped interior of the mounting frame through a second transmission shaft, and the first transmission shaft is arranged parallel to the second transmission shaft.

3. The structure for multi-directional driving and steering of a four-wheeled vehicle according to claim 2, wherein a first gearbox is provided as the first transmission portion, a third transmission shaft is rotatably arranged in the first gearbox, the third transmission shaft is connected to the first transmission shaft through a helical gear, and the first transmission shaft is connected to the driving power input rotation shaft; and a second gearbox is provided as the second transmission portion, a fifth transmission shaft is rotatably arranged in the second gearbox, the fifth transmission shaft is connected to the second transmission shaft through a helical gear, and the second transmission shaft is connected to the steering power input rotation shaft.

4. The structure for multi-directional driving and steering of a four-wheeled vehicle according to claim 3, wherein a third gearbox is provided as the third transmission portion, an interior of the third transmission portion is divided into an upper portion and a lower portion; the upper portion of the third transmission portion is rotatably connected to the first transmission portion through a fourth transmission shaft, and the lower portion of the third transmission portion is rotatably connected to the second transmission portion through a sixth transmission shaft; and the fourth transmission shaft is connected to the third transmission shaft through a helical gear, and the sixth transmission shaft is connected to the fifth transmission shaft through a helical gear.

5. The structure for multi-directional driving and steering of a four-wheeled vehicle according to claim 4, wherein an eighth transmission shaft is rotatably arranged in the third transmission portion, an upper portion of the eighth transmission shaft is rotatably connected to the fourth transmission shaft through a helical gear;

a bottom of the eighth transmission shaft is extended out of the third transmission portion and is rotatably connected to a gearbox seat; a rotatable sleeve is rotatably arranged at a lower portion of the eighth transmission shaft;

a helical gear is arranged on the rotatable sleeve, and the rotatable sleeve is connected to the sixth transmission shaft through the helical gear;

a bottom of the rotatable sleeve is extended out of the third transmission portion and the gearbox seat and is connected to a connecting flange; and the connecting flange is fixedly connected to the fourth transmission portion.

6. The structure for multi-directional driving and steering of a four-wheeled vehicle according to claim 5, wherein a fourth gearbox is provided as the fourth transmission portion, and the eighth transmission shaft is rotatably arranged in the fourth transmission portion and is connected to the driving power output shaft through a helical gear.

7. The structure for multi-directional driving and steering of a four-wheeled vehicle according to claim 5, wherein a U-shaped seat is provided as the mounting seat, the fourth transmission portion is rotatably arranged in the mounting seat through the eighth transmission shaft, and a shock absorber mounting seat configured for mounting the shock absorber is arranged at an outer side of the mounting seat.

8. The structure for multi-directional driving and steering of a four-wheeled vehicle according to claim 5, wherein a ninth transmission shaft is rotatably arranged at an upper portion of an interior of the third transmission portion, and the ninth transmission shaft is connected to the fourth transmission shaft and the eighth transmission shaft through helical gears; and a tenth transmission shaft is rotatably arranged at a lower portion of the interior of the third transmission portion, and the tenth transmission shaft is connected to the rotatable sleeve and the sixth transmission shaft through helical gears.

9. The structure for multi-directional driving and steering of a four-wheeled vehicle according to claim 4, wherein a connecting frame is rotatably arranged at a side of the mounting frame, the connecting frame is rotatably connected to a side of the third transmission portion through the fourth transmission shaft and the sixth transmission shaft respectively.

10. The structure for multi-directional driving and steering of a four-wheeled vehicle according to claim 3, wherein a fifth gearbox is arranged in the mounting frame, and a fourth gearbox is arranged at a lower portion of the mounting frame;

the first transmission shaft is rotatably arranged in the fourth gearbox, and the second transmission shaft is rotatably arranged in the fifth gearbox;

the driving power input rotation shaft is rotatably arranged in the fifth gearbox, and the steering power input rotation shaft is rotatably arranged in the fourth gearbox.

11. The structure for multi-directional driving and steering of a four-wheeled vehicle according to claim 1, wherein a first gearbox is provided as the first transmission portion, a third transmission shaft is rotatably arranged in the first gearbox, the third transmission shaft is connected to a first transmission shaft through a helical gear, and the first transmission shaft is connected to the driving power input rotation shaft; a second gearbox is provided as the second transmission portion, a fifth transmission shaft is rotatably arranged in the second gearbox, the fifth transmission shaft is connected to a second transmission shaft through a helical gear, and the second transmission shaft is connected to the steering power input rotation shaft.

12. The structure for multi-directional driving and steering of a four-wheeled vehicle according to claim 1, wherein an eighth transmission shaft is rotatably arranged in the third transmission portion, an upper portion of the eighth transmission shaft is rotatably connected to a fourth transmission shaft through a helical gear; a bottom of the eighth transmission shaft is extended out of the third transmission portion and is rotatably connected to a gearbox seat; a rotatable sleeve is rotatably arranged at a lower portion of the eighth transmission shaft; a helical gear is arranged on the rotatable sleeve, and the rotatable sleeve is connected to a sixth transmission shaft through the helical gear; a bottom of the rotatable sleeve is extended out of the third transmission portion and the gearbox seat and is connected to a connecting flange; and the connecting flange is fixedly connected to the fourth transmission portion.

13. The structure for multi-directional driving and steering of a four-wheeled vehicle according to claim 12, wherein a fourth gearbox is provided as the fourth transmission portion, and the eighth transmission shaft is rotatably arranged in the fourth transmission portion and is connected to the driving power output shaft through a helical gear.

\* \* \* \* \*